United States Patent [19]

Thomas

[11] 4,026,322
[45] May 31, 1977

[54] RECIPROCATING PUMP CHECK VALVE ASSEMBLY

[75] Inventor: Benjamin A. Thomas, Burton, Wash.

[73] Assignee: Flow Industries, Inc., Kent, Wash.

[22] Filed: Feb. 11, 1976

[21] Appl. No.: 657,180

[52] U.S. Cl. .............................. 137/512; 137/540; 251/333; 251/356

[51] Int. Cl.² ........................................ F16K 15/02

[58] Field of Search .......... 137/512, 512.3, 533.17, 137/540; 251/356, 333

[56] References Cited
UNITED STATES PATENTS

| | | | |
|---|---|---|---|
| 2,666,448 | 1/1954 | Garretson et al. | 137/540 |
| 3,106,169 | 10/1963 | Prosser et al. | 137/512 X |
| 3,702,624 | 11/1972 | Fries | 137/512 |

Primary Examiner—William R. Cline
Attorney, Agent, or Firm—Robert B. Hughes

[57] ABSTRACT

A valve assembly especially adapted for use with very high pressure reciprocating pumps. The main components are coaxially aligned. A main high pressure passage extends through the center of the assembly and has check valves at opposite ends thereof. One of the check valves has an annular valve element comprising inner and outer sleeves which fit against one another with an interference fit. This annular valve element seats against a matching annular inlet passage.

10 Claims, 3 Drawing Figures

RECIPROCATING PUMP CHECK VALVE ASSEMBLY

BACKGROUND OF THE INVENTION

1. FIELD OF THE INVENTION

The present invention relates to a check valve assembly especially adapted for use with a reciprocating pump, particularly for use with a very high pressure pump.

2. DESCRIPTION OF THE PRIOR ART

For use with a reciprocating pump, a common arrangement is to provide a valve assembly where there are two conventional check valves joined by a "T" connection. On the intake stroke of the pump, one of the check valves opens to permit liquid from a low pressure source to flow into the pump, and on the discharge stroke of the pump the other check valve opens to permit the outflow of the liquid under pumping pressure.

However, when very high pressures are involved, the "T" configuration of the valve housing is undesirable since stress concentrations occur which result in early fatigue failure. Hence, it has been undertaken to provide a valve assembly where the check valves are coaxially arranged so that the components of the valve assembly are cylindrically symmetrical. With such an arrangement, the stress concentrations inherent in the "T" configuration are relieved and the valve assembly is capable of operating under high fluctuating pressures without such premature fatigue failure.

In one such prior art configuration, there is an outlet check valve of a conventional type which comprises a spring loaded valve element that fits in a conical seat formed at the outlet opening in the valve housing. Also, there is an inlet check valve which has a valve element of an annular configuration which seats in an annular inlet opening at the opposite end of the housing. With this annular configuration of the valve element of the inlet valve, on the power stroke of the associated pump, the valve element permits high pressure liquid from the pump to flow through the center opening of the valve element and through an axially aligned passage in the valve housing to pass out through the outlet valve. One the intake stroke, low pressure liquid is taken in through the inlet passages symmetrically arranged in the valve housing to flow into the annular intake opening, with the annular valve element moving away from seating engagement to permit this inflow of low pressure liquid.

While such a valve arrangement does relieve the stress concentrations associated with the "T" configuration of a valve assembly, where very high pressures are involved (e.g. in the order of 50,000 psi or more), the valve elements themselves in moving between their open and closed positions are subjected to rather severe loads which create a tendency for these valve elements and the parts they contact to wear. In the particular configuration of a coaxial valve described above, the annular intake valve element and those portions of the housing with which it comes in contact as it seats in its closed position are especially susceptible to wear which ultimately impairs the ability of the valve element to function properly.

In view of the foregoing, it is an object of the present invention to provide a coaxial valve assembly, such as that described above, which alleviates some of the problems of premature wear experienced in prior art valve assemblies such as those described above.

SUMMARY OF THE INVENTION

The present invention is an improvement in a valve assembly adapted for use with very high pressure reciprocating pumps. Such a valve assembly comprises a housing which has a longitudinally aligned main through passage with a rear inlet end and a forward outlet end. At the outlet end of the passage there is a check valve which is or may be of conventional design, and which permits forward flow of high pressure fluid through the outlet end of the main passage and prevents reverse flow back through the main passage.

At the inlet end of the main passage, there is a second check valve. It comprises an annular valve element having a longitudinal axis and moveable along its longitudinal axis between a seating position where it closes an inlet passage and an open position where it permits flow from the inlet passage into the main passage. The inlet passage has an annular configuration and surrounds the main passage.

This annular valve element comprises inner and outer cylindrical sleeves which fit one within the outer in an interference fit. The frictional engagement of the two sleeves is such as to resist relative movement therebetween with a moderate force. Under circumstances of uneven wear between seating surfaces of the two sleeves and matching seating surfaces at the inlet passage, the sleeves are able to shift relative to one another to compensate for such wear and enable the annular valve element to seat properly to close the inlet passage.

In the preferred configuration, the seating surface of the outer sleeve is frusto-conical and slants radially outwardly and away from the inlet passage at approximately a 45° angle from the longitudinal axis of the valve element. The seating surface of the inner sleeve is also frusto-conical and slants radially inwardly and away from the inlet passage also at an angle of about 45° to the axis of the annular valve element.

The annular valve element is positioned in a valve chamber which communicates with both the annular inlet passage and the main through passage. On the pressure stroke of the associated pump, pressurized liquid in this chamber bears against the outer cylindrical surface of the outer sleeve and also against the inner cylindrical surface of the inner sleeve to press the sleeves together and prevent leakage of high pressure fluid between the inner and outer sleeve. Also, the two sleeves have surfaces disposed oppositely to the valve element seating surfaces so that liquid pressure in the chamber exerts a force on each of the sleeves to urge each into seating engagement with its matching surface.

DESCRIPTION OF THE PREFERRED EMBODIMENT

Figure 1:
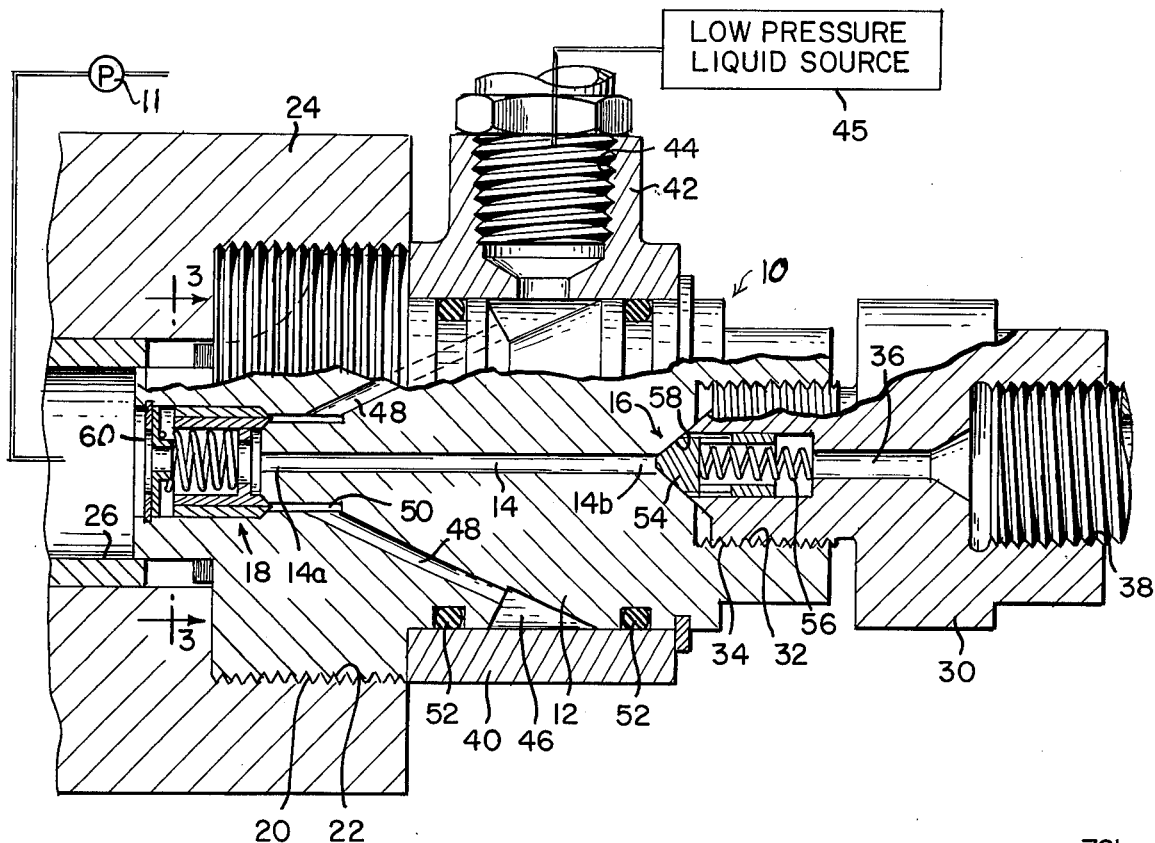
FIG. 1 is a longitudinal view, partly in section, of the valve assembly of the present invention.
Figure 2:
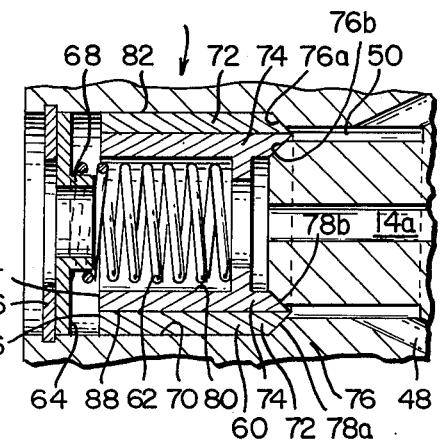
FIG. 2 is a longitudinal sectional view of the annular valve element of the valve assembly drawn to an enlarged scale.
Figure 3:
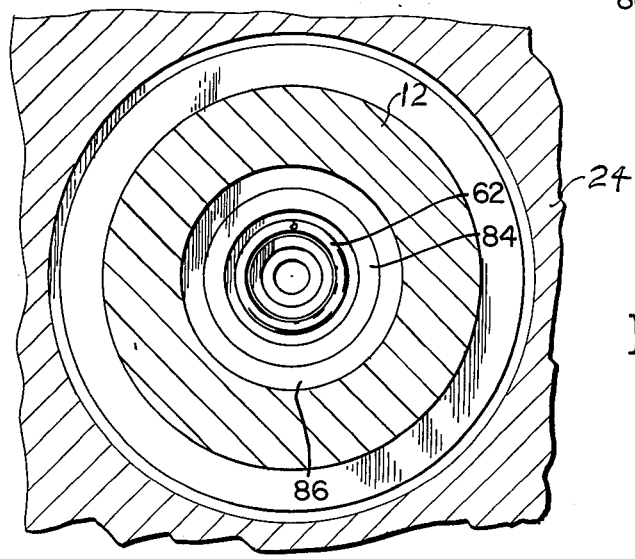
FIG. 3 is a transverse sectional view taken along line 3—3 of FIG. 1 drawn to the scale of FIG. 2.

The valve assembly, generally designated 10 is particularly adapted to be used in conjunction with a reciprocating pump, such a pressure intensifier indicated schematically at 11. The valve assembly 10 comprises a main valve housing 12 having a centrally located longitudinally aligned through passage 14 which a rear inlet end 14a and a forward outlet end 14b. At the outlet end 14b there is an outlet check valve 16 which is or may be of conventional configuration. At the inlet end 14a, there is an inlet check valve 18 whose particular configuration is especially significant in the present invention. However, before describing this inlet valve 18, the main components and over all operation of the valve assembly 10 will be described.

The valve housing 12 has a generally stepped cylindrical configuration and is symmetrical about its center axis. At the inlet end of the valve housing 12, there are provided exterior threads 20 to screw into a matching socket 22 of a high pressure cylinder 24. The cylinder 24 has a centrally located through passage or cylinder bore 26 in which the pump plunger operates and leads directly into the through passage 14 and is axially coincident therewith.

At the outlet end of the valve housing 12 there is an outlet housing 13 having an exteriorly threaded rear end 34 which screws into a socket 32 formed in the forward outlet end of the valve housing 12. This outlet housing 30 has a through passage 36 which leads to the aforementioned passages 14 and 26 and is coaxially aligned therewith. The outlet end of the passage 36 has an expanded threaded portion 38 by which connection may be made to an outlet line.

A cylindrical low pressure inlet housing 40 surrounds the valve housing 12 and has a laterally extending protrusion or boss 42 in which is formed a low pressure inlet opening 44, provided with interior threads to facilitate connection to a low pressure liquid source, indicated schematically at 45. To provide flow from the opening 44 to the inlet check valve 18, the housing 12 is formed with an exterior annular groove 46 which opens to the threaded opening 44. A plurality of slanting passages 48 extend rearwardly and inwardly to lead from the annular groove 46 to a cylindrical valve inlet opening 50 at the location of the inlet check valve 18. A pair of O-rings seals 52 are provided on opposite sides of the annular groove 46 to prevent leakage between the two housings 12 and 40.

The outlet check valve 16 is or may be of conventional design, and as shown herein, it comprises a conical valve element 54 which is urged by a compression spring 56 against a seat 58 formed in the housing 12 at the outlet end of the passage 14 in the shape of a truncated cone. On the inlet stroke of a reciprocating pump with which the valve assembly 10 is associated, the valve element 54 presses against the seat 58 to shut off any flow back through the valve passageway 14. On the outlet stroke of the pump, the force of the high pressure liquid in the passageway 14 forces the valve element away from the seat 58, and the high pressure liquid flows around the element 54 and through the outlet passage 36.

As indicated previously herein, the configuration of the inlet check valve 18 is particularly significant in the present invention. This valve comprises an annular valve element 60 within which is positioned a compression spring 62. The rear end of the spring 62 bears against an annular base member 64 which is held in position by a snap ring 66. The base member 64 has a radially inward, forwardly protruding cylindrical portion 68 which fits within the rear end of the spring 62. The valve element 60 fits with a moderately loose tolerance fit in a valve chamber 70 formed at the rear of the valve housing 18 at the juncture of the aforementioned passageway 14 and cylinder bore 26, and the valve element 60 is able to move from its forward seated position rearwardly against the urging of the spring 62.

The annular valve element 60 is made up of an outer cylindrical sleeve 72 and an inner cylindrical sleeve 74 which fits within the outer sleeve 72 with an interference fit. At the forward end of the inner sleeve 74 there is an annular inward protrusion against which the forward end of the spring 62 bears to urge the valve element 60 forwardly to its seated position.

The seat for the valve element 60 is formed in the housing structure 12 at the rear end of the cylindrical inlet opening 50 and is designated generally by the numeral 76. More specifically, this seat 76 has an annular configuration and comprises an outer annular surface 76a which flares outwardly and rearwardly from the rear of the passage 50, and an inner annular surface 76b which slants radially inwardly and rearwardly from the rear of the passage 50. More precisely, the two surfaces 76a and 76b have the configuration of truncated conical surfaces which slant oppositely from each other at approximately right angles to each other, with each being at an angle of approximately 45° to the longitudinal axis of the valve 10.

The forward end of the valve element 60 is contoured to fit snugly against the seat 76. More specifically, the forward end of the outer sleeve 72 slants radially outwardly and rearwardly at a 45° angle to the longitudinal axis of the valve assembly 10 to provide a surface 78a shaped as a truncated cone which fits against the matching seating surface 76a. In a similar manner, the forward end of the inner sleeve 74 has its forward end tapered radially inwardly and rearwardly at approximately a 45° angle to the longitudinal axis of the valve assembly 10 to provide surface 78b shaped as a truncated cone to fit snugly against the matching surface 76b.

On the intake stroke of the pump 11, the low pressure developed in the cylinder bore 26 causes the valve element 60 to move rearwardly against the compression spring 62 and open the inlet passage 50 to permit liquid from the low pressure source 45 to flow through the passageway 44-46-48-50, with this liquid passing through the center opening of the valve element 60 and into the cylinder bore 26 of the pump. On the pressure stroke of the pump 11, as liquid is compressed to high pressure by the plunger operating in the cylinder bore 26, with the urging of the compression spring 62 the valve element 60 moves forwardly to its closed position against the seat 76. The high pressure liquid flow through the center of the valve element 60, through the passageway 14 to move the forward valve element 54 to its open position and exit through the forward passageway portion 46.

The valve element 60 has a sufficiently loose tolerance fit with respect to the valve chamber 70 and the seating element 74 so that the pressure from the high pressure liquid flowing from cylinder bore 26 is exerted against the inner cylindrical surface 80 of the inner valve element sleeve 74, against the outer cylindrical surface 82 of the outer sleeve 72 of the valve element 60, and against the rear surface of the valve element 60, which rear surface is made up of the rear surface portions 84 and 86 of, respectively, the inner sleeve 74 and the outer sleeve 72. The pressure against the inner and outer cylindrical surface 80 and 82 presses the two sleeve members 72 and 74 more tightly together so that the area of the interference fit 88 between the sleeves 72 and 74 is closed off even more tightly to prevent any leakage of high pressure liquid between the two sleeves 70 and 72. The pressure against the rear surface 84-86 of the valve element 60 pushes the valve element 60 forwardly against the seat 76 with a sufficiently high force to close off the inlet passage 50.

With very high pressure pumps (e.g. those where fluid is pumped at pressures as high as 50,000 psi or more), on each stroke of the pump 11 the valve element 60 moves against its seat 76 with a force which is very high relative to the rather small area of contact of the valve element 60 against the seat 76. In similar prior art valve configuration, a quite critical problem has been the premature deterioration of the inlet valve of the valve of the valve assembly, with the consequent leakage of high pressure liquid back through the low pressure inlet passage on the pressure stroke of the associated pump 11. However, it has been found that the particular configuration of the inlet valve 18 of the present invention alleviates this problem to a significant extent. With the very high pressures involved and very high velocity flow of liquid through the valve assembly 10, it is difficult to ascertain with complete precision all the physical phenomena which takes place in the operation of this valve assembly. However, it is believed that the following hypothesis can be presented with reasonable justification.

First, the wear tend to occur mainly at the contacting surfaces of the valve element 60 and its seat 76. In the particular configuration of the inlet valve 18 shown herein, these are the two seating surfaces 76a and 76b and the two valve contact surfaces 78a and 78b. However, where the greatest wear occurs in any specific valve assembly is difficult to predict, possibly because such wear may be related to very slight deviations of surface dimensions within manufacturing tolerances.

Let is be assumed that the outer seating surface 76a experiences excessive wear so that there is a tendency for leakage to occur around the outer valve surface 82 and between the surfaces 76a and 78a to the passage 50. In this situation, with very high pressures being exerted against both of the rear valve element surfaces 84 and 86 on each pressure stroke of the pump 11, the resultant force on the outer sleeve 72 is sufficient to overcome the frictional resisting force of the interference fit of the two sleeves 72 and 74 to cause the outer sleeve 72 to shift very slightly with respect to the inner sleeve 74 so that the outer matching surfaces 76a and 78a come into proper engagement when the valve element 60 is positioned against its seat 76. In like manner, if there is greater wear at the inwardly positioned surfaces 76b and 78b, the inner sleeve 74 tends to shift forward very slightly relative to the outer sleeve 72 to cause proper engagement of those two surfaces.

The frictional engagement of the interference fit between the sleeves 72 and 74 should not be so great as to inhibit the moderate shifting between the two sleeves 72 and 74. In a valve actually constructed as described herein and as shown in the accompanying drawings, with the outside diameter of the valve element 60 being one-half of an inch, the engaging surfaces of the two sleeves 72 and 74 were machined to a tolerance such that the sleeve 74 could be forced into the sleeve 72 with a pushing force of about 50 pounds. When this valve was used in conjunction with a reciprocating pressure intensifying pump that developed fluid pressures of approximately 50,000 psi, the valve functioned quite satisfactorily.

What is claimed is:
1. A valve assembly adapted for use with a very high pressure reciprocating pump, said valve assembly comprising:
   a. a housing having a longitudinal axis and a longitudinally aligned main passage with an inlet end and a outlet end,
   b. a check valve at the outlet end of the main passage to permit forward flow through the oulet end of the main passage and to prevent reverse flow back through said main passage,
   c. said housing having an annular low pressure inlet passage surrounding the main through passage and communicating therewith,
   d. an annular valve element having a lengthwise axis and moveable along its axis between a seating position where a first end portion of the valve closes said inlet passage from said main passage, and an open position where it permits flow form said inlet passage into said main passage, said annular valve element comprising:
      1. an outer annular sleeve having a first seating surface at the first end portion of the valve element to engage a first matching seating surface at said inlet passage,
      2. an inner cylindrical sleeve positioned within the outer sleeve and having a second seating surface at the first end of the valve element to engage a second matching seating surface at the inlet passage, and
      3. said inner and outer sleeves frictionally engaging each other with an interference fit to provide seal therebetween and permit some axial shifting between the sleeves in response to fluid pressure in the main passage to provide proper closing arrangement of the valve first and second seating surface of the valve elements with both the first and second matching seating surfaces.

2. The valve assembly as recited in claim 1, wherein said first seating surface slants radially outwardly and away from said inlet passage, and said second seating surface slants radially inwardly and away from said inlet opening.

3. The valve assembly as recited in claim 1, wherein said housing defines a valve element chamber in which said valve element is positioned, said chamber communicating with both said inlet passage and said main passage, said valve element fitting within said chamber with a sufficiently loose tolerance that a cylindrical outer surface of said outer sleeve is exposed to radially inward pressure in said chamber, and an inner cylindrical surface of said inner sleeve is exposed to radially outward pressure, to enhance sealing engagement between said sleeves.

4. The valve assembly as recited in claim 3, wherein said inner and outer sleeves have surfaces at a second end portion of the valve element disposed oppositely to said first and second seating surfaces, whereby liquid pressure in said chamber urges each of the inner and outer sleeves into seating engagement.

5. The assembly as recited in claim 4, wherein said first seating surface slants radially outwardly and away from said inlet passage, and said second seating surface slants radially inwardly and away from said inlet opening.

6. A valve adapted for use with very high pressure reciprocating pump, said valve comprising:
  (a) a housing having a main passage,
  (b) said housing having an annular low pressure inlet passage leading to the main passage,
  (c) an annular valve element having a lengthwise axis and moveable along its lenghtwise axis between a seating position where a first end portion of the valve element closes said inlet passage from said main passage, and an open position where it permits flow from said inlet passage into said main passage, said annular valve element comprising:
    1. an outer annular sleeve having a first seating surface at the first end portion of the valve element to engage a first matching seating surface at said inlet passage,
    2. an inner cylindrical sleeve positioned within the outer sleeve and having a second seating surface at the first end of the valve element to engage a second matching seating surface at the inlet passage, and
    3. said inner and outer sleeves frictionally engaging each other with an interference fit to provide a seal therebetween and permit some axial shifting between the sleeves in response to fluid pressure in the main passage to provide proper closing engagement of the valve elements with both the first and second matching seating surfaces.

7. The valve as recited in claim 6, wherein said first seating surface slants radially outwardly and away from said inlet passage, and said second seating surface slants radially inwardly and away from said inlet opening.

8. The valve as recited in claim 6, wherein said housing defines a valve element chamber in which said valve element is positioned, said chamber communicating with both said inlet passage and said main passage, said valve element fitting within said chamber with a sufficiently loose tolerance that a cylindrical outer surface of said outer sleeve is exposed to radially inward pressure in said chamber, and an inner cylindrical surface of said inner sleeve is exposed to radially outward pressure, to enhance sealing engagement between said sleeves.

9. The valve as recited in claim 8, wherein said inner and outer sleeves have surfaces at a second end portion of the valve element disposed oppositely to said first and second seating surfaces, whereby liquid pressure in said chamber urges each of the inner and outer sleeves into seating engagement.

10. The valve as recited in claim 9, wherein said first seating surface slants radially outwardly and away from said inlet passage, and said second seating surface slants radially inwardly and away from said inlet opening.

* * * * *